US009382728B1

(12) United States Patent
Williams

(10) Patent No.: US 9,382,728 B1
(45) Date of Patent: Jul. 5, 2016

(54) GARAGE DOOR OPENER SECURITY SYSTEM

(71) Applicant: Edward David Williams, Tucson, AZ (US)

(72) Inventor: Edward David Williams, Tucson, AZ (US)

(*) Notice: Subject to any disclaimer, the term of this patent is extended or adjusted under 35 U.S.C. 154(b) by 0 days.

(21) Appl. No.: 14/745,072

(22) Filed: Jun. 19, 2015

Related U.S. Application Data

(60) Provisional application No. 62/016,009, filed on Jun. 23, 2014.

(51) Int. Cl.
*F16M 13/00* (2006.01)
*E05B 65/00* (2006.01)
*E05D 13/00* (2006.01)
*E05B 47/00* (2006.01)

(52) U.S. Cl.
CPC ......... *E05B 65/0021* (2013.01); *E05B 47/0002* (2013.01); *E05D 13/00* (2013.01)

(58) Field of Classification Search
CPC ............ E05B 65/0021; E05B 47/0002; E05B 47/026; E05B 47/0004; E05D 13/00; E05F 15/681; E05F 15/00; E05Y 2201/214; E05Y 2201/244; E05Y 2201/686; E05Y 2900/516; E05Y 2900/106
USPC ..................... 248/552; 160/201, 188; 49/280; 292/DIG. 36
See application file for complete search history.

(56) References Cited

U.S. PATENT DOCUMENTS

| | | | | |
|---|---|---|---|---|
| 3,397,488 | A * | 8/1968 | Goldstein | E05F 15/676 160/188 |
| 3,431,004 | A * | 3/1969 | Schell | A47K 13/242 24/335 |
| 4,231,191 | A * | 11/1980 | Ellmore | E05F 15/684 49/139 |
| 4,344,252 | A * | 8/1982 | Suzuki | E05F 15/668 318/266 |
| 5,533,561 | A | 7/1996 | Forehand, IV | 160/188 |
| 6,273,174 | B1 | 8/2001 | Singleton | 160/201 |
| 6,463,989 | B1 * | 10/2002 | Johnson | E05B 65/0894 160/201 |
| 6,481,684 | B1 * | 11/2002 | Farmer | B60R 11/0241 248/225.11 |
| 7,025,712 | B2 * | 4/2006 | Parrilla | A63B 21/072 482/104 |
| 7,665,504 | B2 * | 2/2010 | Schulze | E05F 15/668 16/DIG. 1 |
| 7,992,833 | B1 * | 8/2011 | Goodman | A47G 25/0614 248/298.1 |
| 8,215,604 | B1 * | 7/2012 | Keicher | H01Q 1/12 248/511 |
| 8,914,919 | B1 * | 12/2014 | Schubert | A47K 13/242 4/253 |
| 8,936,064 | B1 * | 1/2015 | Diaz | E05F 15/681 160/201 |
| 2004/0048723 | A1 * | 3/2004 | Parrilla | A63B 21/072 482/94 |
| 2004/0144031 | A1 * | 7/2004 | Ferreyra | E05F 15/668 49/95 |

* cited by examiner

*Primary Examiner* — Anita M King
(74) *Attorney, Agent, or Firm* — Hayes Soloway P.C.

(57) ABSTRACT

A security system for prevent unauthorized release of a garage door opener from outside the garage, includes a generally J-shaped bracket having a generally L-shaped extension on the distal end thereof, for installation on a garage door opener track. The bracket has one or a plurality of slots or holes through a distal leg of the generally L-shaped portion for accommodating an attachment device for attaching the bracket to garage door release lever.

8 Claims, 5 Drawing Sheets

GARAGE DOOR OPENER SECURITY SYSTEM

CROSS-REFERENCE TO RELATED APPLICATIONS

This application claims priority from U.S. provisional application 62/016,009, filed Jun. 23, 2014, the contents of which are incorporated herein in their entirety.

BACKGROUND OF THE INVENTION

The invention relates to a garage door opener security system. More particularly, the invention relates to a system for preventing unauthorized entry into a garage by manipulating the manual release of a garage door opener from outside the garage.

When constructing a building, care is taken to ensure that access is provided to authorized occupants, while unauthorized persons are deterred or otherwise prevented from entry. A thief or would-be wrongdoer, seeking entry into a building, will look for the "weakest link" in the building's security. Since only one weakness is required to gain entry, whichever entry point or security system that is most easily defeated will be attacked and exploited.

Garage doors often create several possibilities for a breach of security. One technique of gaining unauthorized access involves simply rolling the door upward, using its own tracks and rollers to make the thief's job easier. U.S. Pat. No. 5,533,561 to Forehand sought to make the garage door more secure by automatically inserting a locking pin into the trackway to prevent the door from being moved more than a few inches. Locking devices are somewhat problematic, in that they can prevent the door from being opened in an emergency, during a power failure, or when the powered opener simply fails.

Consequently, garage doors with locking devices such as that proposed by Forehand also now include a release mechanism to allow the door to be manually opened in case of a power failure or other emergency. Accordingly, most garage door openers today include a release lever, which acts to release the locking mechanisms or release the garage door drive train so that the garage door can be manually operated. These release levers typically are provided near the door itself, and are typically operated by simply pulling a cord which dangles beneath the release lever.

However, these release mechanisms themselves create a considerable opportunity for a security breach. Many garage doors close leaving a small space immediately above the door, between the door frame and uppermost door section. This space may be covered with a rubber gasket. But, this space often is large enough to allow a thin item to be inserted into the garage from outside. Accordingly, it is quite possible for an unauthorized person to stand outside of the garage, reach into the garage with a hooked wire such as a coat hanger, and operate the garage door opener release mechanism. With practice, unauthorized access can be gained in seconds. Thus, it can be said that the manual-override release mechanisms of current garage door openers provide a "weak link" in the security of millions of dwellings in the United States alone.

The foregoing background discussion derives from U.S. Pat. No. 6,273,174 to Singleton in which there is described a garage door opener security system, for preventing the unauthorized opening of a garage door, mounted within a dwelling. The garage door opener is of the type having a track mounted to the dwelling, and a truck slidably mounted on the track which is operatively engaged with the door. A release lever extends downward from the truck to allow manual release and opening of the garage door. The Singleton security system prevents unauthorized operation of the release lever by providing a pair of security plates which extend downward from the truck on either side of the release lever. According to Singleton, the security plates prevent an unauthorized person from extending an object into the garage from outside in an attempt at operating the release lever.

FIG. 1 illustrates a garage door opener system 10, including security plates in accordance with U.S. Pat. No. 6,273,174 to Singleton. The system comprises a garage door 12 installed within a dwelling 14. The dwelling 14 includes a door frame header 16. A garage door opener 16 is anchored to the dwelling, and is operatively engaged with the garage door 12 to allow the garage door to open and close. A small space is present between the garage door 12 and door frame header 16. A rubber strip 17 extends in this space to prevent moisture from entering the garage therethrough.

The garage door opener 16 includes a drive train 18, which includes a track 20, a truck 22 slidably mounted on the track 20, and a power source 24 which pulls the truck 22 rearward to open the garage door 12. Accordingly, the truck 22 is attached to the garage door by means of a main arm 26. The main arm 26 is attached to the garage door with a vertical bracket 28, such that the main arm is pivotally attached at both the vertical bracket 28 and the truck 22.

A release mechanism 30, which comprises a release arm 32, is pivotally mounted to the truck 22 at a pivot axle 34. A release spring 36 connects the release arm 32 to the truck 22 and biases the release arm 32 toward the truck 22, causing the release arm 32 to return to its initial position once it has been pulled downward.

To operate the release arm 32, it must be pulled downward from a point opposite the pivot axle 34. However, in a typical garage installation, the release arm is located approximately six or seven feet above the garage floor. Accordingly, a release cord 36 is often attached to the release arm 32 fully opposite from the pivot axle 34 to allow a person standing inside the garage to easily operate the release arm 32.

The release a 32 not only provides a convenient way for an authorized user to manually open the garage door 12, but also provides an opportunity for an unauthorized person to reach into the garage door through the small space above or around the garage door using a hooked item and operate the release arm 32. As noted supra, the Singleton U.S. Pat. No. 6,273,174 provides a security system 40 comprising a pair of security plates 42 which extend vertically alongside the release arm 32, purportedly to prevent an item from reaching the release arm from the side. That is to say, Singleton provides a security system 40 comprising a pair of security plates 42 which extend vertically alongside the release arm 32, to prevent an intruder from reaching the release arm from the side.

While the garage door opener security system described in U.S. Pat. No. 6,273,174 may be useful to prevent unauthorized access under some circumstances, this prior patented system still leaves the release lever cord exposed and the release lever fully functional. Thus, an intruder could still reach into the garage with a hooked wire, grab the release lever cord or the release lever, and pull the release lever.

SUMMARY OF THE INVENTION

The present invention provides a positive locking system for garage door release lever that overcomes the aforesaid and other problems of the prior art. More particularly, the garage door opener security system in accordance with the present invention provides a universal garage door security system comprising a generally J-shaped bracket designed to fit over the garage door track. The J-shaped bracket includes an L-shaped extension on its distal end. One or a plurality of holes or slots are provided through a distal end of the bracket for accommodating a threaded bolt and nut, preferably a wing nut, or a padlock, which engages and locks the release arm. The bracket is installed in place of the release lever cord.

The present invention also provides a method for preventing unauthorized access to a garage, which comprises removing the pull cord from the garage door release lever, and installing the security system as above described on the garage door opener in place of the release cord.

The present invention also provides a garage door opener security system kit comprising a bracket as above described, and a hook for affixing to the distal end of the pull cord after the pull cord is removed from the garage door opener.

BRIEF DESCRIPTION OF THE DRAWINGS

Further features and advantages of the present invention will be seen from the following detailed description, taken in conjunction with the accompanying drawings, wherein.

Figure 1:
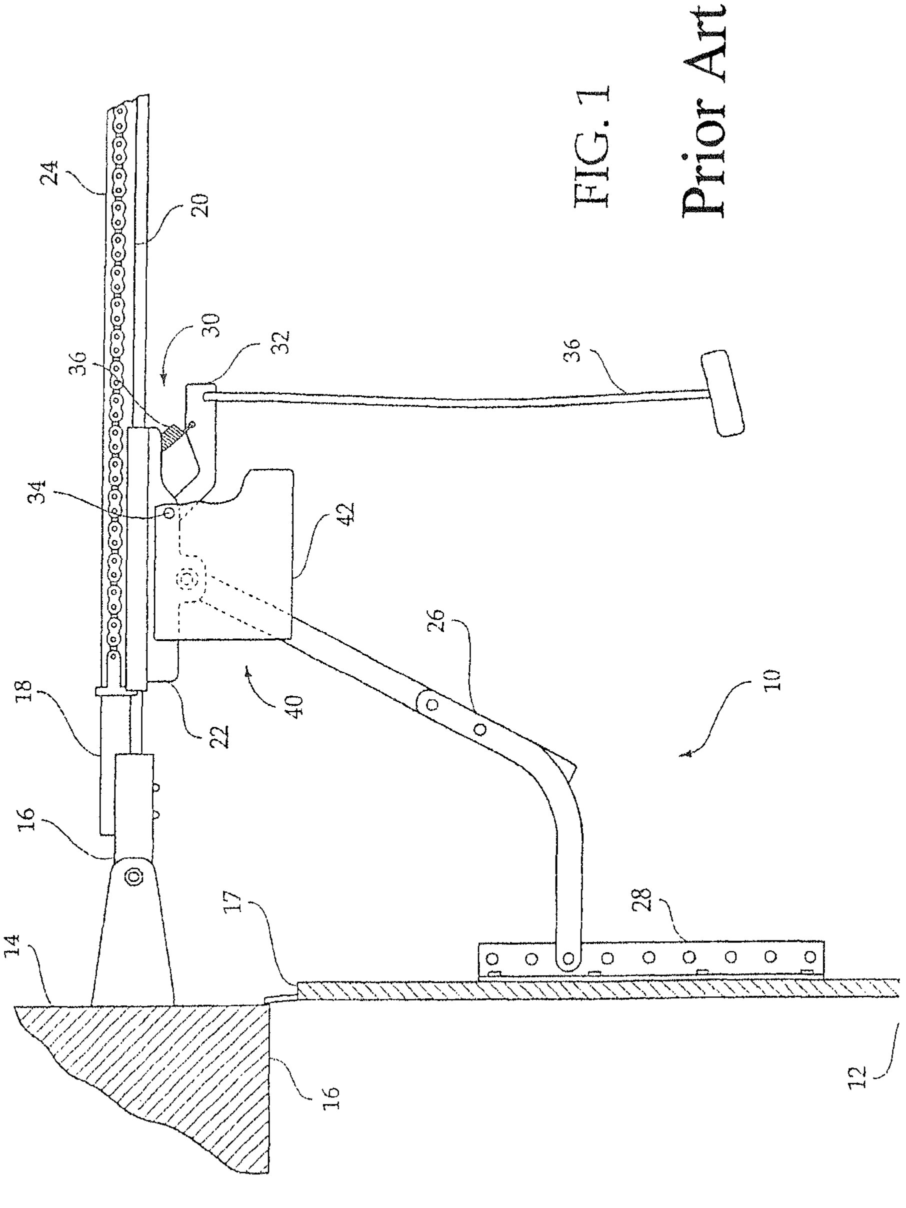
FIG. 1 Prior Art
FIG. 1 is a side elevational view of a garage door opener with a security system in accordance with the prior art.
Figure 2:
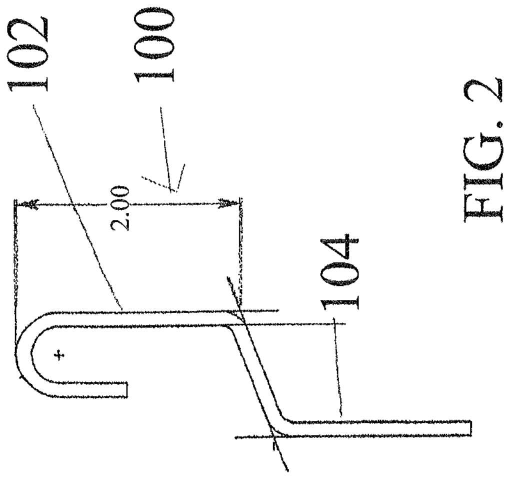
FIG. 2 is a side elevational view of a universal locking bracket in accordance with the present invention.
Figure 3:
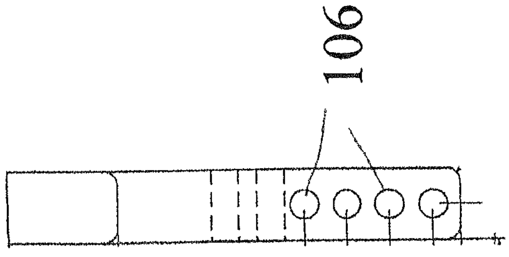
FIG. 3 is a plan view thereof.
Figure 4:
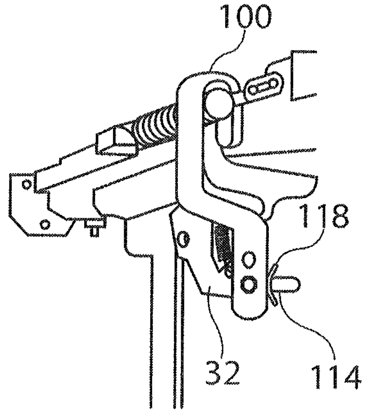
FIG. 4 is a perspective view showing installing of the security bracket on a garage door track in accordance with one embodiment of the invention.

Referring in particular to FIGS. 2-4, 6 and 7, a security bracket 100 in accordance with the present invention comprises a generally J-shaped section 102 having a generally L-shaped section 104 attached to a distal end thereof. An elongate slot or a plurality of holes 106 are provided through a leg of the L-shaped portion of the bracket.

Installation of the security bracket in accordance with the present invention is quite straight-forward. One starts by removing the emergency release cord and handle from the distal end of the garage door release arm 32 in a first step 110. Bracket 100 is then hooked over the track or trolley in step 112, and a threaded bolt 114 inserted through an appropriate hole 106 in bracket 100 and through the hole (not seen) at the distal end of release lever 32 at step 116. A nut, preferably a wing nut, 118 is then threaded on the bolt 114.

Figure 6:
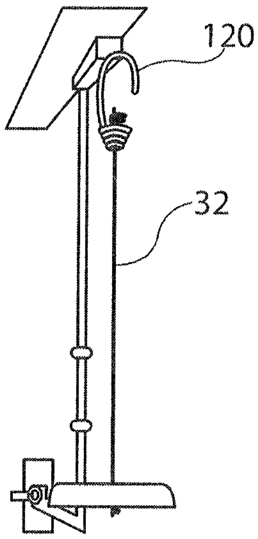
FIG. 6 is a perspective view showing how a modified pull cord may be readily temporarily re-installed for emergency use in accordance with the present invention.
Figure 7:
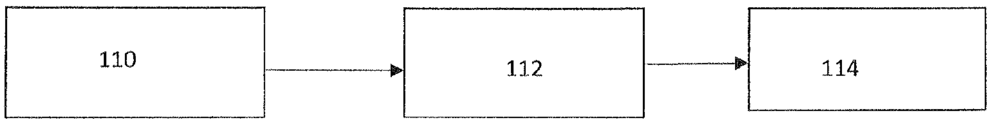
FIG. 7 is a flow diagram illustrating the present invention.

Referring in particular to FIG. 6, an open hook 120 is attached to the end of cord 32, and the cord hung elsewhere in the garage for emergency use. In the event, for example, of power failure, bracket 100 readily may be removed by an authorized person within the garage, and the cord temporarily hooked through release lever 32 for use.

Figure 5:
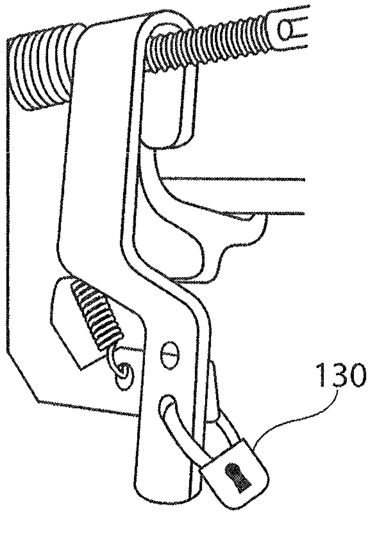
FIG. 5 is a view similar to FIG. 4 of an alternative embodiment.

Alternatively, as illustrated in FIG. 5, in place of bolt 114, a keyed or combination lock 130 may be installed to lock the bracket 100 on the release lever 32.

The present invention provides a garage door opener security system which provides unauthorized access to the garage by preventing easy unauthorized access to the release mechanism. But yet, the security system readily may be removed and the release cord re-installed temporarily for emergency use.

Various changes may be made in the above invention without departing from the spirit and scope thereof.

The invention claimed is:

1. A security system for preventing unauthorized release of a garage door opener from outside a garage, comprising a generally J-shaped bracket having a generally L-shaped extension on a distal end thereof, for installation on a garage door opener track, said bracket having one or a plurality of slots or holes through a distal leg of the generally L-shaped extension for accommodating a key lock or a combination lock for attaching the bracket to garage door release lever.

2. A method for preventing unauthorized access to a garage, which comprises removing a pull cord from the garage door release lever, and installing the security system of claim 1 on the garage door opener in place of the removed pull cord.

3. A garage door opener security system kit comprising a bracket as claimed in claim 1, and a hook for affixing to a distal end of a garage door pull cord.

4. A method for preventing unauthorized access to a garage through a garage door, which comprises removing a pull cord from a release lever on the garage door, and installing a security system comprising a generally J-shaped bracket having a generally L-shaped extension on a distal end thereof, for installation on a garage door opener track, said bracket having one or a plurality of slots or holes through a distal leg of the generally L-shaped extension for accommodating an attachment device for attaching the bracket to garage door release lever, on the garage door opener in place of the removed pull cord.

5. The method as claimed in claim 4, wherein the attachment device comprises a threaded bolt and nut.

6. The method of claim 5, wherein the nut comprises a wing nut.

7. The method of claim 4, wherein the attachment devices comprises a lock.

8. The method of claim 7, wherein the lock comprises a key lock or a combination lock.

* * * * *